United States Patent [19]

Dûnbar

[11] Patent Number: 4,961,700
[45] Date of Patent: Oct. 9, 1990

[54] SHAPING MEANS FOR THE PRODUCTION OF FIBER-REINFORCED PREFORM ARTICLES

[75] Inventor: Sidney Dûnbar, Granville, Ohio

[73] Assignee: Owens-Corning Fiberglas Corporation, Toledo, Ohio

[21] Appl. No.: 392,181

[22] Filed: Aug. 10, 1989

Related U.S. Application Data

[63] Continuation of Ser. No. 284,581, Dec. 15, 1988, abandoned, which is a continuation of Ser. No. 35,555, Apr. 7, 1987, abandoned.

[51] Int. Cl.$^5$ .............................................. B29C 67/14
[52] U.S. Cl. ................................... 425/394; 264/257; 425/395; 425/398; 425/400; 425/423
[58] Field of Search ............... 264/257, 258; 425/350, 425/351, 394, 395, 398, 400, 412, 422, 423, 519, 554, 571

[56] References Cited

U.S. PATENT DOCUMENTS

| | | | |
|---|---|---|---|
| 814,058 | 3/1906 | Leyers | 425/395 |
| 1,554,599 | 9/1925 | Schavoir | 425/519 |
| 2,789,332 | 4/1957 | Scott | 425/422 |
| 2,797,179 | 6/1957 | Reynolds et al. | 264/257 |
| 2,896,555 | 7/1959 | Marcus et al. | 425/412 |
| 3,153,262 | 10/1964 | Steketee | 425/351 |
| 3,264,392 | 8/1966 | Taplin | 425/398 |
| 3,362,045 | 1/1968 | Hinton et al. | 425/519 |
| 4,069,000 | 1/1978 | Hampshire | 425/395 |
| 4,338,070 | 7/1982 | Nava | 425/112 |
| 4,438,062 | 3/1984 | Griffith et al. | 264/257 |
| 4,514,353 | 4/1985 | Alexander et al. | 425/398 |
| 4,576,566 | 3/1986 | Hain | 425/400 |
| 4,755,128 | 7/1988 | Alexander et al. | 425/422 |

OTHER PUBLICATIONS

Preforming of Unifilo by L. Pomini–Vetrotex St. Gobain, Dec. 19, 1985.

Primary Examiner—Jay H. Woo
Assistant Examiner—C. Scott Bushey
Attorney, Agent, or Firm—Patrick P. Pacella; Catherine B. Martineau

[57] ABSTRACT

A shaping apparatus for the production of fiber reinforced articles is disclosed. The shaping means includes a first screen having a surface defining the contoured shape of the article; a second screen having a complementary surface defining the reverse contoured shape of the article; and, at least one resilient presser rod operatively attached to the first screen or the second screen. The presser rod engages the fiber matting and presses the fiber matting into either a portion of the first screen or the second screen as the screens are closed together. The shaping apparatus is particularly suitable for the manufacture of glass fiber-reinforced automobile bumpers.

6 Claims, 2 Drawing Sheets

SHAPING MEANS FOR THE PRODUCTION OF FIBER-REINFORCED PREFORM ARTICLES

This application is a continuation of U.S. Ser. No. 07/284,581 filed Dec. 15, 1988 now abandoned, which was a continuation of U.S. Ser. No. 035,555 filed Apr. 7, 1987, now abandoned.

BACKGROUND OF THE INVENTION

This invention relates to a means for shaping fiber-reinforced articles. In one of its more specific aspects, this invention pertains to a means for shaping glass reinforced fibrous mats using double preform screens with moveable presser rods. The shaping means is particularly suitable for the manufacture of automobile bumper reinforcements.

The production of glass fiber-reinforced materials into useful shapes is well-known. Normally the glass reinforced fibrous mat is preformed and then placed in a mold for shaping into a final product. Typically, glass fiber reinforced mats are used in situations where a desired strength of the reinforced mat is necessary, such as in automobile bumpers. For example, layers of the glass fiber-reinforced mat are fabricated separately and then combined in a mold to make the final product. The mat layers are fabricated using a set of preform screens which consist of an upper and a lower screen where each screen is stretched to conform to the shape of the final product. The top screen stretches and bends the glass fibrous mat to conform to the shape of the bottom screen. However, such preform screens can cause problems wherein the screens often undesirably stretch the glass fiber-reinforced mats beyond acceptable limits causing the mats to thin out or tear. Also, the preform screens do not always position the fiber mat into the far corners of the mold, causing "radius bridging" wherein the corners are slightly rounded or incomplete.

The production of articles from glass fiber preform mats in such manner is a time-consuming process since the manufacture of a preform normally includes at least a two-step operation: first, layers of initial preform material are prepared; and second, the layers of additional preform material are placed into a mold and then cured to form a final product. In addition, the currently used means for producing the fiber-reinforced mats cause difficulty in handling of the preform materials both during the manufacturing process and the preforming process.

Considerable time and expense would be saved if a glass reinforcement preform product could be made in a high speed operation which entails only one fabricating operation instead of two separate operations.

It would be beneficial if various combinations of different fibrous reinforcement materials could easily be fabricated into final preform products.

Further, it would also be beneficial if glass fibrous reinforced products could be made without compromising the integrity of the final product, either by stretching of the fiber-reinforced mat during the shaping process or by thinning of the corners of the mat caused by radius bridging during the shaping process.

SUMMARY OF THE INVENTION

According to the present invention there is provided a means for shaping fiber reinforced mats into a preform. The means for shaping fiber-reinforced mats includes a double preform mold screen with movable presser rods. The shaping means includes an upper screen having moveable presser rods which act to position a central portion of the fiber reinforced mat within a complementary lower screen portion. As the presser rods move the central portion of the mat into position within the complementary lower screen portion, the distal portions of the mat are slideably moved along the contours of the screen such that the mat is moved into position within the preform screens. As the upper and lower screens move toward each other, the mat conforms to the shape of the preform screens. The shaping means of the present invention thus allows for the molding of a fiber-reinforced mat which maintains its desired thickness without stretching any portion of the mat. The shaping means of the present invention is particularly suitable for the manufacture of automobile bumper reinforcements.

According to the present invention, the preform final product can be made in one high speed production process. There is no need for a two-step operation first entailing forming a preform glass fibrous mat and thereafter molding the preform in a molding operation. The shaping means of the present invention can be used with various methods for curing or setting of the fiber-reinforced mats to produce preforms. The preforms produced using the shaping means of the present invention are more compact thus allowing for greater ease of handling. The shaping means of the present invention does not stretch the fiber reinforcements or cause any radius bridging or gapping of the fiber-reinforced mat within the preform screen or mold.

These and other aspects and advantages of the present invention will become clear after consideration is given to the detailed description of the invention which follows.

DETAILED DESCRIPTION OF THE INVENTION

The present invention relates to a means for shaping fiber-reinforced mats. The present invention further relates to a means for shaping fiber-reinforced mats using double preform mold screens with moveable presser rods. The present invention is compatible with various different glass-fiber reinforcements. In one example, a continuous strand mat and a material such as a Cofab ®, which is a product of Gulf States Paper Company and is parallel unidirectional rovings knitted together, are layered in a specific configuration. In practice, alternate piles of the mat and Cofab material are layered in a specific configuration to form a reinforcement for an automobile bumper. For example, a specific configuration of: mat, Cofab material, mat, mat, Cofab material, Cofab material, and mat, have been placed together in a preform shape and molded to produce bumpers which pass the U.S. Government's 5-mph crash test.

Other reinforcement configurations such as mat, Cofab material, Cofab material, mat, Cofab material, Cofab material, mat; or mat, Cofab material, mat, Cofab material, mat, Cofab material, mat; or mat, mat, Cofab material, Cofab material, Cofab material, mat, mat, can be used as bumper reinforcements. Further, other reinforcements such as woven rovings, Kelvar ®, or graphite could also be used.

The present invention specifically relates to a means for shaping bumper reinforcements using double preform screens and moveable presser rods. In order to produce a bumper reinforcement, the fibrous blanket or mat must be held in shape during the cure process where preform binder materials are added to the mat.

Referring now to FIGS. 1–4 and FIGS. 1 and 2 in particular, the means for shaping fiber-reinforced mats of the present invention is shown. The shaping means 10 generally includes an upper preform screen 12 and a lower preform screen 14, each screen having the desired shape of the final reinforced product. If desired, the screens can be made of a perforated material so that heat can pass readily into the fiber reinforced mat or so that extraneous water can be driven off. In the embodiment shown in FIGS. 1–4, the preform screens 12 and 14 generally define the shape of an automobile reinforcement bumper.

Figure 1:
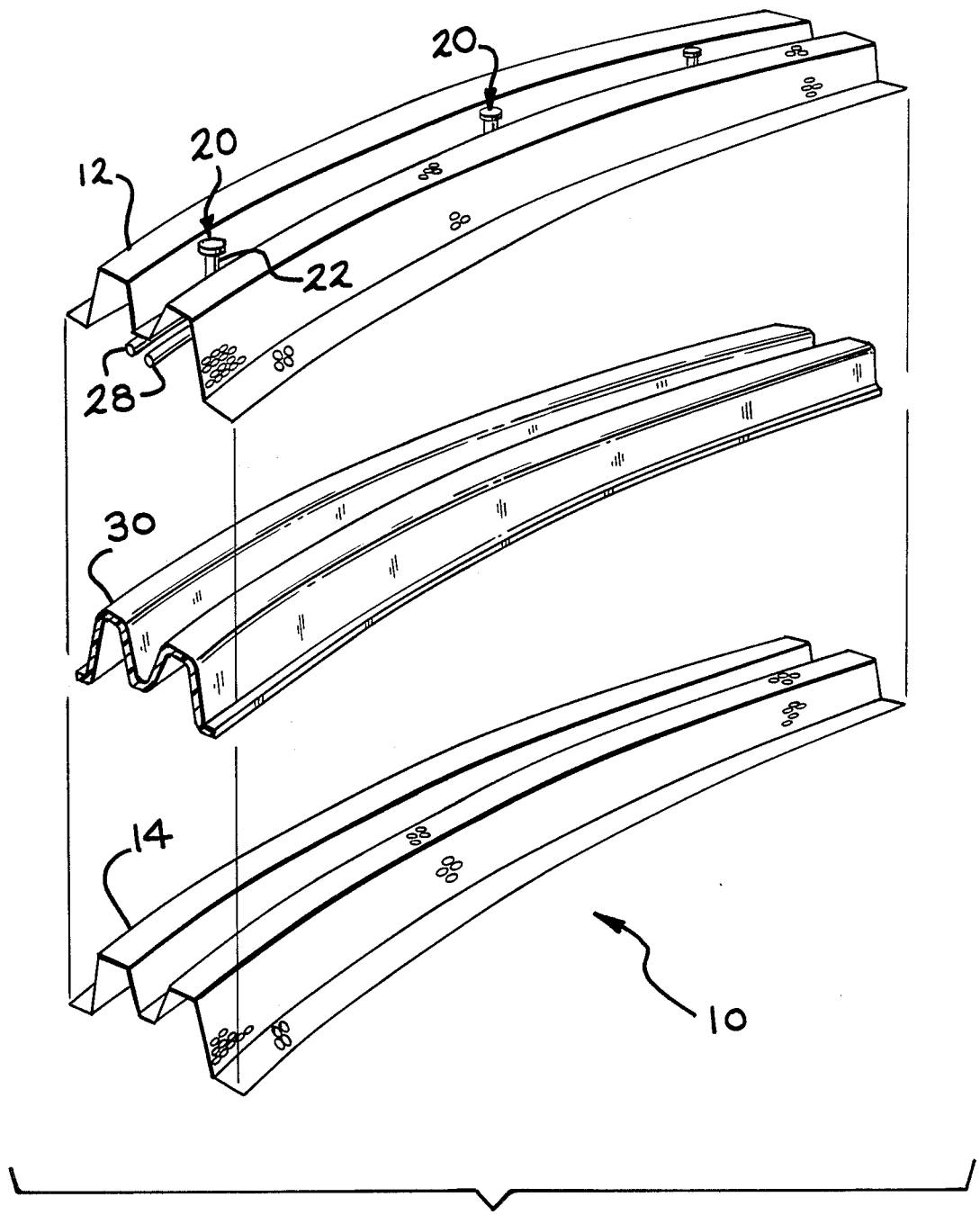
FIG. 1 is an exploded perspective view of a shaping means of the present invention.
Figure 2:
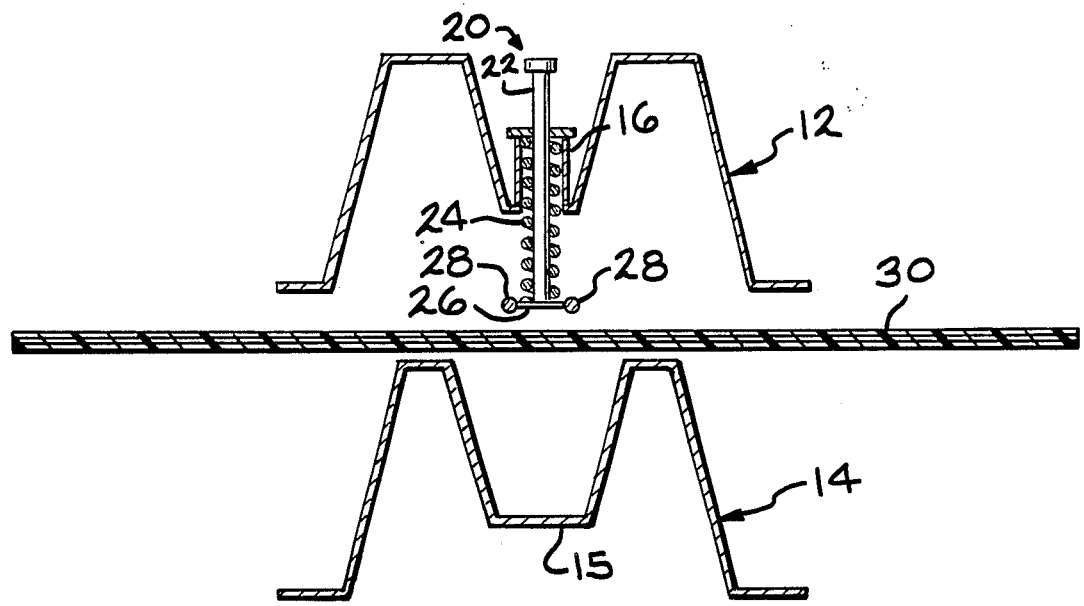
FIG. 2 is a cross-sectional view of the shaping means in an open position.
Figure 3:
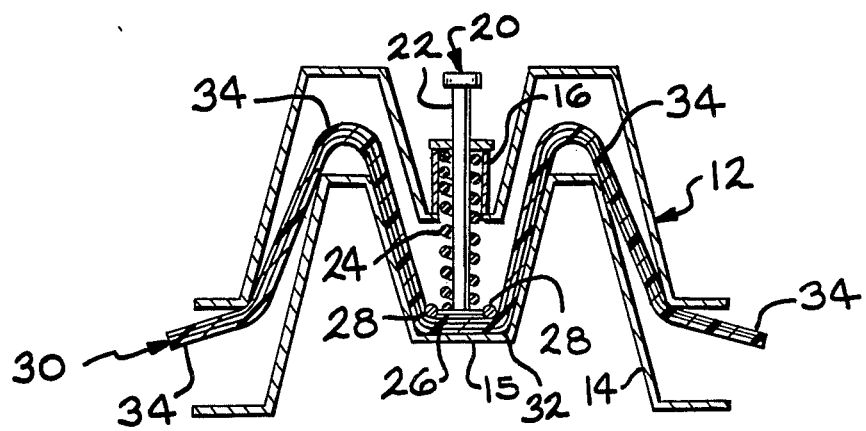
FIG. 3 is a cross-sectional view of the shaping means in a partially closed position.
Figure 4:
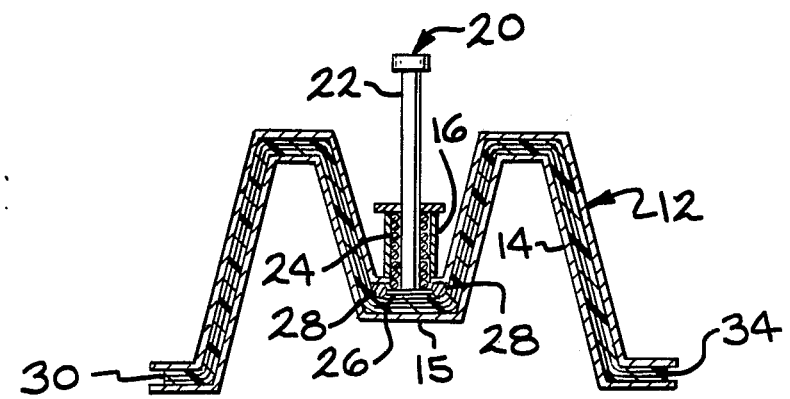
FIG. 4 is a cross-sectional view of the shaping means in a closed position.

Referring now to FIGS. 2–4 and to FIG. 2 in particular, the upper preform screen 12 further includes at least one presser means 20. In the embodiment shown, the presser means 20 is operatively attached to the upper screen 12. However, it is within the contemplated scope of this invention to include further presser means on either the upper or lower screens. The presser means 20 extends in a generally vertical direction through a central portion 16 of the upper preform screen 12. The presser means 20 generally includes a vertically extending shaft 22 concentrically surrounded by a spring 24. The shaft 22 is operatively attached at one end to a spacer bar 26. The spacer bar 26 extends from the shaft 22 in an outward direction away from the shaft 22. The spacer bar 26 is operatively connected at each end to presser rods 28. The presser rods 28, as shown in FIG. 1, are positioned parallel to the length of the preform screens 12 and 14. The length of the spacer bar 26 and the presser rods 28 is complementary with a predetermined region on the lower screen 14, as will be more fully described herein.

Referring now to FIG. 2, a reinforcement continuous strand mat blanket 30 is placed between the upper and lower preform screens, 12 and 14, respectively. There is also provided a means (not shown) for placing the continuous strand mat blanket between the upper screen and the lower screen. The reinforcement blanket 30 can be wetted with a preform binder material to provide 5 to 10 percent added loss on ignition (LOI). The reinforcement blanket 30 may be wetted prior to, or after being placed between the preform screens. Referring now to FIG. 3, the upper preform screen 12 containing the presser means 20 is moved in a direction toward the lower preform screen 14. As the upper screen 12 moves in a direction toward the lower screen 14 the presser rods 28 are the first part of the presser means 20 to contact the reinforcement blanket 30. As pressure is applied by the presser means 20 and as the upper preform screen 12 continue to move in a direction toward the lower preform screen 14, the added pressure of the presser rods 28 against the reinforcement blanket 30 then forces a central portion 32, as shown in FIG. 3, of the reinforcement blanket 30 down into a central portion 15 of the bottom preform screen 14. As the presser rods 28 push down on the reinforcement blanket 30, the balance of the blanket 30 is free to move or slide toward the central axis of the upper and lower preform screens 12 and 14. The presser rods 28 also serve to anchor the reinforcement blanket 30 in position in the central portion 15 so that the blanket 30 cannot slip out of position. As pressure continues to be placed by the upper preform screen 12, and as the upper preform screen 12 continues to move in a direction toward the lower preform screen 14, outer lying portions 34 of the reinforcement blanket 30 which are distal to the portion 32 being shaped by the presser rods 28, are also shaped by the upper and lower preform screens, 12 and 14, respectively.

FIG. 4 shows the preform screens 12 and 14 fully closed with the reinforcement blanket 30 being conformed to the shape of the preform screens 12 and 14. The screens 12 and 14 are held together with, for example, a clamping device (not shown) and then placed into an oven at 300°–400° F. for approximately 10–15 minutes in order to cure the preform binder material. After the oven cure, the preform screens 12 and 14 are removed and unclamped and the finished preform product is removed. The finished preform product containing all the necessary layers of reinforcement material molded together is stiffer that when the preform is molded in two separate operations. The present invention facilitates easier handling of the finished preform product. It is contemplated that, when automobile bumpers are made, robotic equipment can be used to pick up the reinforcement preform and place it in the mold. This is particularly advantageous since preform material stiffness is an important feature when considering handling ease by robotic equipment.

The present invention for making preform products from reinforcement mat blankets are useful with a number of processes which enable final reinforced products to be made in a speedy and efficient manner.

In one process, the binder material is added before enclosing the reinforcement blanket within the preform screens. The shaped blanket containing binder material held between the two screens is passed through a narrow oven which directs heat through the screens and through the shaped reinforcement blanket to dry the blanket and to cure the binder material. The reinforcement blanket is heated for approximately 1–3 minutes at 400°–500° F. After the screens pass out of the oven, the screens are opened and the preform is removed. The screens are then recycled.

In another process, preform screens are attached to a belted caterpillar-type puller. A roll of blanket reinforcement material is unrolled onto the belted caterpillar-type puller and binder material is added by a suitable applicator. The preform screens are moved together to form the blanket to its desired shape. The preform screens in the belted puller are heated so that extraneous water is driven from the binder material. The binder material cures to hold the reinforcement blanket in its preform shape. The preform final product exits the belted puller and is cut to a desired length at a cutoff station.

In another process, the bottom screen is held stationary and is hinged to the top screen. When the screens are set apart, the reinforcement blanket is positioned between the screens and applied binder material to the blanket in a suitable manner. The blanket is moved into the lower screen as the top screen is closed onto the bottom screen thus shaping the reinforcement blanket.

Heat is then injected through the screens to dry and cure the reinforcement blanket. The screens are opened and the completed preform product is removed.

A further process includes direct molding of a final product wherein a roll of reinforcement blanket material is stationed next to the mold. The predetermined length of the blanket is unrolled, cutoff and placed in the mold. The mold has presser rods and as the mold is closed the presser rods first stabilize the reinforcement blanket in the center of the mold. As the mold continues to close the blanket conforms to the shape of the upper and lower mold halves. After the mold is completely closed, a matrix resin injected into the reinforcement blanket. After a suitable period of time, the mold is opened and the finished preform product is removed.

While reference has been made to the preferred embodiments of the present invention, those skilled in the art may recognize that various modifications may be made which modifications shall be accorded the broadest scope of the intended claims so as to encompass all equivalent shaping means and the like.

I claim:

1. A shaping apparatus for the production of fiber reinforced preform articles having a contoured shape comprising, in combination:
    a first screen member having a surface defining the contoured shape of the article;
    a second screen member having a complementary surface defining a reverse contoured shape of the article;
    means for placing a fiber matting between said first screen member and said second screen member;
    means for moving said first screen member and said second screen member in a direction toward each other; and
    at least one resilient presser means operatively attached to said first screen or said second screen for engaging a portion of said fiber matting and pressing said fiber matting into a portion of either said first screen member or said second screen member before said screen members are moved together; the pressure of said presser means against said engaged portion of said fiber matting forcing said engaged portion of said fiber matting into said portion of either said first screen member or said second screen member, said presser means anchoring said portion of said fiber matting in said portion of either said first screen member or said second screen member, the balance of said fiber matting having at least one point of contact with said surface of either said first screen member or said second screen member, said balance of said fiber matting opposite said point of contact being free to slideably move with respect to said complementary surface of either said first screen member or said second screen member such that said balance of said fiber matting is not stretched, and is not compressed at said point of contact as said balance of said fiber matting moves in a direction toward said engaged portion of said fiber matting; said first screen member and said second screen member shaping said fiber matting and applying molding pressure to said shaped fiber matting.

2. The apparatus of claim 1 further including a means for heating said matting positioned between said screen members to produce a fiber reinforced preform in the shape of the article.

3. The apparatus of claim 1 further including a means for injecting a liquid resin into said fiber matting positioned between said screen members whereby said fiber matting is permeated with said liquid resin.

4. The apparatus of claim 3 further including a means for said resin permeated fiber matting to produce the fiber reinforced preform screen article.

5. The apparatus of claim 1 wherein said presser means includes a plurality of bar members spaced from said surface of said first screen member for engaging said matting and pressing said matting onto said complementary surface of said second screen member.

6. The apparatus of claim 5 wherein said bar members are operatively attached to said first screen member by a spring member, said spring member being adapted to compress as said first screen member moves toward said second screen member and to draw said bar members into a contiguous position with the complementary surface of said second screen member.

* * * * *